United States Patent
Kikuchi et al.

(10) Patent No.: US 6,504,590 B1
(45) Date of Patent: Jan. 7, 2003

(54) LIQUID CRYSTAL DISPLAY AND TIMEPIECE

(75) Inventors: Masami Kikuchi, Kodaira (JP); Tomomi Murakami, Higashimurayama (JP); Takashi Toida, Tokyo (JP)

(73) Assignee: Citizen Watch Co., LTD, Nishitokyo (JP)

(*) Notice: Subject to any disclaimer, the term of this patent is extended or adjusted under 35 U.S.C. 154(b) by 0 days.

(21) Appl. No.: 09/555,969

(22) PCT Filed: Oct. 7, 1999

(86) PCT No.: PCT/JP99/05553
§ 371 (c)(1),
(2), (4) Date: Jun. 7, 2000

(87) PCT Pub. No.: WO00/20919
PCT Pub. Date: Apr. 13, 2000

(30) Foreign Application Priority Data

Oct. 7, 1998 (JP) .......................................... 10-285018

(51) Int. Cl.⁷ .................... G02F 1/1335; G02F 1/1339; G09G 4/00
(52) U.S. Cl. .......................... 349/113; 349/142; 368/84
(58) Field of Search ................................. 349/113, 142; 368/84, 240; 396/300; 395/479; 364/246

(56) References Cited

U.S. PATENT DOCUMENTS 4,040,727 A * 8/1977 Ketchpel .................... 350/288
6,097,458 A * 8/2000 Tsuda et al. ................. 349/114
6,285,426 B1 * 9/2001 Akins et al. ................. 349/114

FOREIGN PATENT DOCUMENTS

| EP | 0359494 | 3/1990 |
|----|---------|--------|
| JP | 57-139781 | 8/1982 |
| JP | 62-235593 | 10/1987 |

* cited by examiner

*Primary Examiner*—William L. Sikes
*Assistant Examiner*—P. R. Akkapeddi
(74) *Attorney, Agent, or Firm*—Armstrong, Westerman & Hattori, LLP

(57) ABSTRACT

A liquid crystal display device (1) comprises a liquid crystal display panel (3) and a reflector (5) disposed on the side of the liquid crystal display panel, opposite from the visible side thereof. The liquid crystal display panel (3) comprises liquid crystal (3f) sandwiched between two transparent substrates (3a, 3b), and display electrodes (3c, 3d) made up of a transparent and electrically conductive film provided on the inner faces of the respective substrates (3a 3b). The reflector (5) is provided with protrusions (5a) formed at positions corresponding to the display electrodes (3c, 3d) on a face thereof opposite to the liquid crystal display panel (3). Accordingly, light transmitted through the liquid crystal display panel (3) falls on the protrusions (5a) of the reflector (5), and respective components of light reflected from the surface of the respective protrusion (5a) will reach the eyes of a viewer with differences in arrival time due to the surface condition of the respective protrusions (5a), so that information displayed by characters and so forth is three-dimensionally perceived by the viewer.

40 Claims, 10 Drawing Sheets

LIQUID CRYSTAL DISPLAY AND TIMEPIECE

TECHNICAL FIELD

The present invention relates to a liquid crystal display device widespread in use as a display unit of various electronic equipment, and an electronic timepiece incorporating the liquid crystal display device as a display unit for displaying at least either of time information and calendar information.

BACKGROUND TECHNOLOGY

A liquid crystal display device has thus far been widespread in use as a display unit of an electronic timepiece (watch, or clock), a cellular phone, a desktop electronic calculator, an electronic dictionary, a portable play station, and various other electronic equipment, for displaying information as required (in the form of characters and graphics).

With such a liquid crystal display device, it is useful to display three-dimensional information as required not only because of enhancement in deliverability of information so as to facilitate viewing of the information but also because of a greater possibility that a wider variety in design can be provided.

There has been available a conventional liquid crystal display device for displaying three-dimensional information, wherein a plurality of liquid crystal display panels are deposited on one after another such that three-dimensional display can be indicated by inputting different driving signals to the respective liquid crystal display panels.

However, such a conventional liquid crystal display device, as described becomes thick as it has the plurality of the liquid crystal display panels deposited on one after another, and is therefore unsuitable for use as a display unit of small-sized portable electronic equipment such as an electronic wrist watch which are under particular size constraints. Accordingly, it has not reached a stage of practical application.

The invention has been developed in view of such a situation as described above, and an object of the invention is to provide a flat type liquid crystal display device capable of three-dimensionally displaying characters and so forth without incorporating therein a plurality of liquid crystal display panels deposited on one after another, and also an electronic timepiece incorporating the liquid crystal display device, and capable of displaying time information and calendar information by use of the same.

DISCLOSURE OF THE INVENTION

In order to achieve the object described above, the invention provides a liquid crystal display device and an electronic timepiece that are made up as described in the following.

The liquid crystal display device according to the invention comprises a liquid crystal display panel and a reflector disposed on the side of the liquid crystal display panel, opposite from the visible side thereof. Further, the liquid crystal display panel comprises liquid crystal sandwiched between two transparent substrates, and display electrodes, made up of a transparent and electrically conductive film, provided on the inner faces of the respective substrates. The reflector is provided with protrusions formed at positions corresponding to the display electrodes, respectively, on a face thereof, opposite to the liquid crystal display panel.

With the liquid crystal display device according to the invention, made up as described above, when voltage is selectively applied to the display electrodes of the liquid crystal display panel for displaying information such as characters, and so forth, light transmitted through the liquid crystal display falls on the protrusions of the reflector. Not all components of light reflected from the surface of the protrusions reach a viewer at the same time but respective components of light will reach the eyes of the viewer with differences in arrival time due to the surface condition of the protrusions. As a result, display in the form of characters, and so forth, is three-dimensionally perceived by the viewer.

The liquid crystal of the liquid crystal display panel are preferably scattering type liquid crystal that undergo switching back and forth between a light scattering state and a transparent state by voltage applied from the display electrodes.

Since use of the scattering type liquid crystal can eliminate the need of using a polarizing film (sheet polarizer), it is possible to obtain a very high utilization efficiency of light, thereby enabling bright display to be effected.

In such a case, for the scattering type liquid crystal, any one selected from the group consisting of polymer network liquid crystal, polymer dispersion liquid crystal and dynamic scattering liquid crystal is preferably used.

Also, for the liquid crystal, guest-host liquid crystal provided with a dichroic dye may be used in place of the scattering type liquid crystal.

The plane pattern of the protrusions formed on the reflector is preferably rendered substantially in the form of a figure similar to that of the plane pattern of the display electrodes of the liquid crystal display panel. In such a case, the protrusions preferably has the pattern width narrower than that of the display electrodes of the liquid crystal display panel.

The protrusions of the reflector are preferably formed in a shape having a curved convex surface without ridgelines. Also, the protrusions of the reflector may be formed in a mushroom-like shape in section with the uppermost face having a curved convex surface and extending sideways from both sidewalls of the base of the respective protrusions.

The reflector is preferably made up of an aluminum sheet, and the protrusions are preferably formed of aluminum or material having a surface reflectance higher than that of aluminum, such as gold, silver, nickel, and so forth. Otherwise, the protrusions may be formed of copper, and a thin gold film may be formed on the surfaces thereof.

A surface reflectance of the uppermost face of the respective protrusions of the reflector may be differentiated from that of the side faces thereof. In such a case, the uppermost face of the respective protrusions is preferably rendered a mirror-finished surface while the side faces thereof are preferably rendered light scattering surfaces.

In the case where the respective substrates of the liquid crystal display panel are provided with a plurality of display electrodes for displaying different pieces of information, respectively, the reflector, is preferably provided with a plurality of protrusions at positions corresponding to the plurality of the display electrodes, respectively, formed on the face thereof, opposite to the liquid crystal display panel, and at least respective reflection faces of the plurality of the protrusions are preferably formed of materials in reflection colors differing from each other depending on spots of formation thereof.

In such a case, for the materials in different reflection colors, gold, silver or nickel, copper, and so forth, may be used.

A protective film of clear paint is preferably formed on the respective reflection faces of the plurality of the protrusions formed of such materials as described above.

Otherwise, the plurality of the protrusions may be formed of a coating of paints in different colors depending on spots of formation thereof on a reflection face of the reflector.

An electronic timepiece according to the invention is provided with a liquid crystal display device comprising a liquid crystal display panel for displaying at least either of time information and calendar information, and a reflector disposed on the side of the liquid crystal display panel, opposite from the visible side thereof. The liquid crystal display panel of the liquid crystal display device comprises liquid crystal sandwiched between two transparent substrates and display electrodes for displaying at least either of the time information and calendar information made up of a transparent and electrically conductive film formed on the inner face of the respective substrates. Further, the reflector is provided with protrusions formed at positions corresponding to the display electrodes, respectively, on a face thereof opposite to the liquid crystal display panel.

The configuration of the liquid crystal display device, and particularly, that of the reflector thereof can be variously modified as described in the foregoing.

The electronic timepiece according to the invention is capable of displaying time information and calendar information three-dimensionally, and consequently, its visibility can be improved and variety in design thereof can be increased.

BEST MODE FOR CARRYING OUT THE INVENTION

Figure 1:
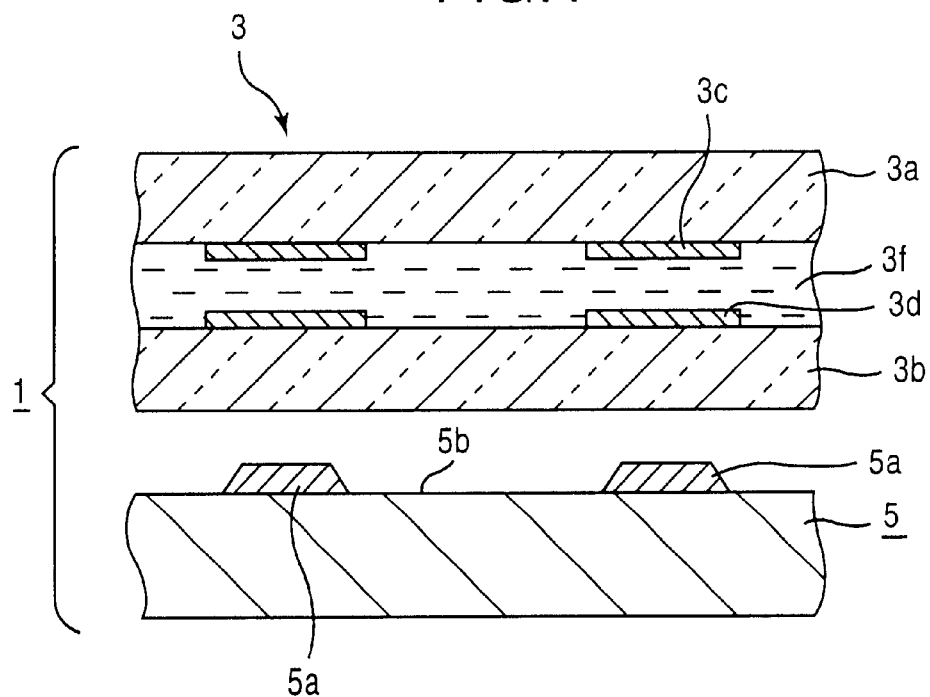
FIG. 1 is a schematic sectional view of an embodiment of a liquid crystal display device according to the invention, showing a part thereof.
Figure 2:
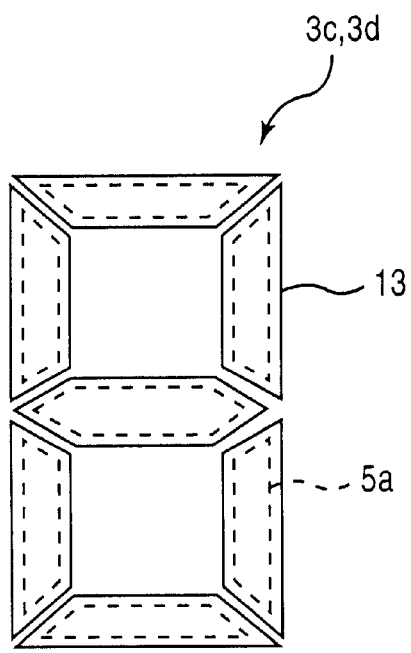
FIG. 2 is a view showing an example of a plane pattern shape of display electrodes of a liquid crystal display panel and that of protrusions of a reflector, shown in FIG. 1.

Preferred embodiments of the invention will be described in detail hereinafter with reference to the attached drawings.
Liquid Crystal Display Panel: FIGS. 1 and 2

An embodiment of a liquid crystal display device according to the invention is described with reference to FIGS. 1 and 2. FIG. 1 is a schematic sectional view of the liquid crystal display device, showing a part thereof.

The liquid crystal display device 1 is made up of a liquid crystal display panel 3 and a reflector 5 disposed on the side of the liquid crystal display panel 3, opposite from the visible side (the upper side in the figure) thereof. The liquid crystal display panel 3 comprises liquid crystal 3f sandwiched between two transparent glass substrates, that is, a first substrate 3a and a second substrate 3b, and first display electrodes 3c and second display electrodes 3d made up of a transparent and electrically conductive film and provided on the inner faces of the first substrate 3a and the second substrate 3b respectively. The reflector 5, is provided with protrusions 5a formed at positions corresponding to the first display electrodes 3c and the second display electrodes 3d, respectively, on a light reflection face 5b thereof, opposite to the liquid crystal display panel 3.

The first display electrodes 3c and second display electrodes 3d are made up of a transparent and electrically conductive film such as an indium tin oxide (ITO) film, and the ones for displaying numbers are generally patterned such that one character is indicated by a seven segment electrodes 13 as shown FIG. 2.

The first substrate 3a and the second substrate 3b are stuck together at the periphery thereof with a sealing material not shown, and the liquid crystal 3f are sealed in a gap formed therebetween.

Polymer network liquid crystal which are among scattering type liquid crystal, that is, a mixture of liquid crystal and transparent solid is used as the liquid crystal 3f.

After a photopolymerizing organic monomer is dissolved in the liquid crystal and injected into the gap formed between the first substrate 3a and the second substrate 3b, ultraviolet radiation is applied thereto, thereby forming the transparent solids through photopolymerization of the organic monomer.

With the liquid crystal display panel using the polymer network liquid crystal, display is effected by taking advantage of anisotropy in the optical refractive index of the liquid crystal. That is, in the case where the liquid crystal and the transparent solids have a substantially equal optical refractive index, the liquid crystals will be in a transparent state, and as the optical refractive index of the liquid crystal differs more from that of the transparent solids, a degree of light scattering will increase, thereby effecting display by turning the liquid crystal into a light scattering state.

In practice, characters and so forth are displayed by applying a predetermined driving signal to the first display electrodes 3c and second display electrodes 3d thereby controlling the optical refractive index of the polymer network liquid crystal and switching it back and forth between the light scattering state and the transparent state.

For the reflector 5, an aluminum sheet, for example, may be used, and although the protrusions 5a may be formed of aluminum, the same is more preferably formed of another metallic material such as gold, silver, nickel and so forth having a surface reflectance higher than that of aluminum.

With the liquid crystal display device 1 made up as described above, since the liquid crystal 3f of the liquid crystal display panel 3 are the polymer network liquid crystal that is the scattering type liquid crystal, and a polarizing film (polarizer) is not used, nearly all light transmitted through portions where a voltage is applied to the liquid crystal 3f via the first display electrodes 3c and second display electrodes 3d and the liquid crystal 3f is turned transparent, and falls onto the protrusions 5a of the reflector 5. That is, light falling on the liquid crystal display panel 3 from the visible side (the upper side in FIG. 1) thereof arrives at the reflector 5 without transmission loss.

The light falling on the protrusions 5a of the reflector 5 is reflected at the surface of the protrusions 5a, and is transmitted through the liquid crystal display panel 3 again before outgoing towards the visible side thereof and reaching the eyes of a viewer. Not all components of light reflected from the surface of the protrusions 5a reach the eyes of the viewer at the same time, but respective components of the light will reach the eyes of the viewer with differences in arrival time due to the surface condition of the protrusions 5a. As a result, information displayed by characters, and so forth, is three-dimensionally perceived by the viewer, enabling images with a three-dimensional effect to be displayed.

In order that the light transmitted through the liquid crystal display panel 3 can be reflected at the protrusions 5a of the reflector 5 as described above, a plane pattern of the protrusions 5a is rendered substantially similar, as shown in FIG. 2, to a plane pattern of the first display electrodes 3c and the second display electrodes 3d, respectively. Further, each of the protrusions 5a of the reflector 5 preferably has a pattern width narrower than that of each of the first display electrodes 3c as well as the second display electrodes 3d. Accordingly, the plane pattern of the protrusions 5a of the reflector 5 is in the form of a similar figure a size smaller than the plane pattern of the first display electrodes 3c as well as the second display electrodes 3d.

With such a configuration as described above, the light transmitted through the liquid crystal display panel 3 will be reflected by the top face as well as the side faces of each of the protrusions 5a of the reflector 5, so that display having a greater three-dimensional effect can be indicated due to reflection by different reflection faces.

The first and second display electrodes 3c, 3d and the protrusions 5a of the reflector 5 are sized such that differences in the pattern width therebetween will allow for any error in work for aligning the liquid crystal display panel 3 with the reflector 5. Further, it is sufficient for the protrusions 5a to have a height in the range of 30 to 150 μm.

The liquid crystal display device 1 wherein the polymer network liquid crystal is sandwiched in the gap formed between the first substrate 3a and the second substrate 3b is described as above by way of example, however, besides the polymer network liquid crystal, polymer dispersion liquid crystal composed of liquid crystal in the form of fine particles dispersed in polymers, dynamic scattering liquid crystal composed of nematic liquid crystals having negative dielectric anisotropy with a small amount of electrically conductive impurities dissolved therein, and so forth may be used as the scattering type liquid crystal.

Further, as other liquid crystal enabling display to be effected without use of a polarizing film, use may also be made of guest host-liquid crystal which is mixed type liquid crystal with a dichroic dye dissolved therein, capable of controlling alignment of the dichroic dye following movement of liquid crystal molecules thereof when the alignment condition of the liquid crystal molecules is altered by the agency of an electric field.

Otherwise, twisted nematic (TN) liquid crystal or supertwisted nematic (STN) liquid crystal in combination with a polarizing film may be used as well, through the light transmission efficiency slightly declines.

Methods of Forming the Protrusions on the Reflector and Variations of an Embodiment of the Protrusion: FIGS. 3A to 13B Various methods of forming the protrusions 5a on the reflection face of the reflector 5 of the liquid crystal display device 1 described above, and variations of the embodiment of the protrusions 5a are described hereinafter. Figures referred to in the following description are sectional views of the reflector 5, similar to FIG. 1, and parts corresponding to those in FIG. 1 are denoted by the same reference numerals.

First, a method of forming the protrusions on the reflector by the transfer method is described with reference to FIGS. 3A and 3B.

Figure 3A:
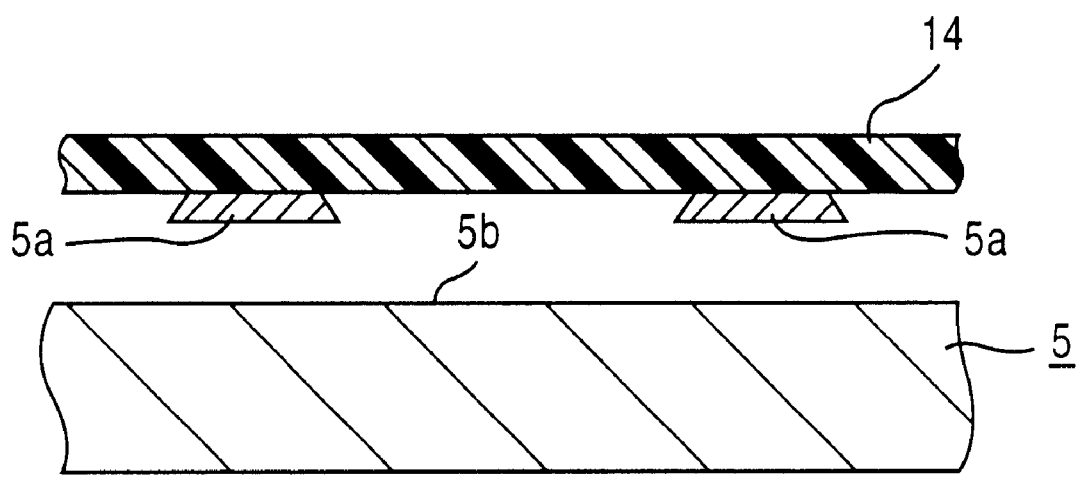
FIGS. 3A and 3B are sectional views of the reflector, and so forth, for illustrating a method of forming the protrusions on the reflector by the transfer method.
Figure 3B:
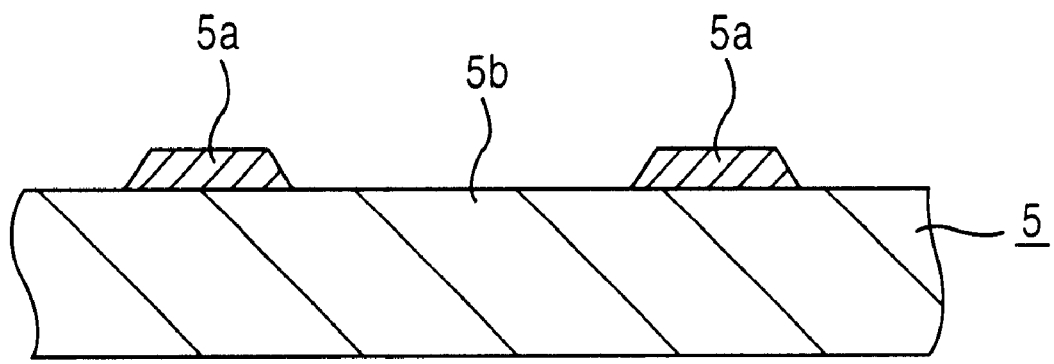

With this method, as shown in FIG. 3A, protrusions 5a are first formed at required spots on a transparent resin film 14 by the plating method, respectively. As a constituent material of the respective protrusions 5a, a material having a high surface reflectance such as gold (Au), silver (Ag), nickel (Ni), and so forth is preferably used. On the face of the respective protrusions 5a facing a reflector 5, a thermosetting adhesive layer (not shown) is formed. Further, the transparent resin film 14 is bonded to the protrusions 5a at an adhesive strength just enough not to permit peeling off from each other.

Then, the transparent resin film 14 with the protrusions 5a formed thereon is placed on a reflection face 5b of the reflector 5 made of aluminum, and pressure is applied thereto while applying a heat treatment at the same time.

Thereupon, the protrusions 5a are transferred onto the surface of the reflector 5. Thereafter, by peeling off the transparent resin film 14, the reflector 5 with the protrusions 5a formed at required spots thereon as shown in FIG. 3B is obtained.

Now, a method of forming the protrusions on the reflector by the electroplating method is described with reference to FIGS. 4A to 4C.

Figure 4A:
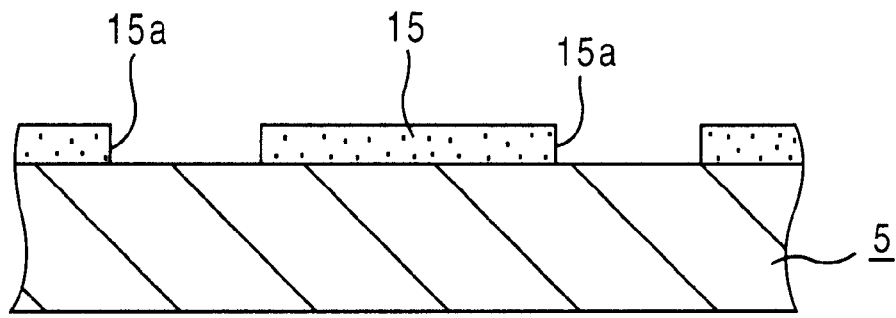
FIGS. 4A to 4C are sectional views of the reflector, and so forth, for illustrating a method of forming the protrusions on the reflector by the electroplating method.

First, as shown in FIG. 4A, a photoresist 15 made of a photosensitive material is formed on the entire surface of a reflection face 5b of a reflector 5 made of aluminum to a thickness equivalent to the thickness of the protrusions. There are available various methods of forming the photoresist 15 such as the spin coating method, the dipping method wherein the reflector 5 is immersed in a photoresist liquid and then pulled up, the method of laminating a dry film resist to the reflector 5, and so forth.

Thereafter, the photoresist 15 is patterned such that openings 15a are formed in regions where the respective protrusions are to be formed as shown in FIG. 4A, using the photolithography method wherein an exposure treatment is applied thereto by use of a predetermined photomask and, a development treatment is applied thereto.

Figure 4B:
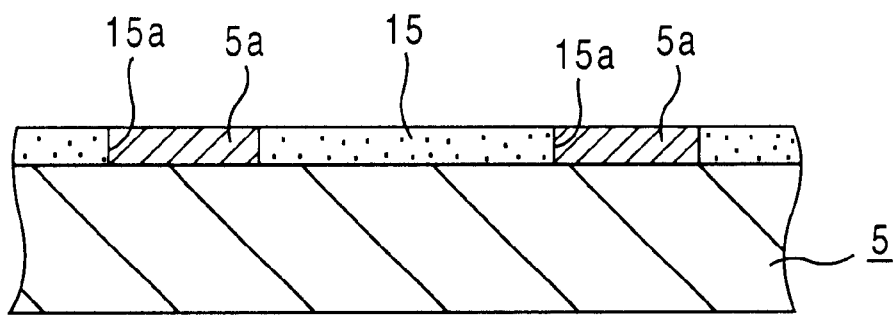

Subsequently, as shown in FIG. 4B, the respective protrusions 5a made up of a plating film are formed within the openings 15a of the photoresist 15 by the electroplating method. In this case, electroplating is controlled so as to form the plating film having a thickness equivalent to that of the photoresist 15.

In this electroplating method, the reflector 5 serves as a plating electrode while the photoresist 15 serves as a plating mask, and as described above, the plating film is formed within the openings 15a of the photoresist 15.

Figure 4C:
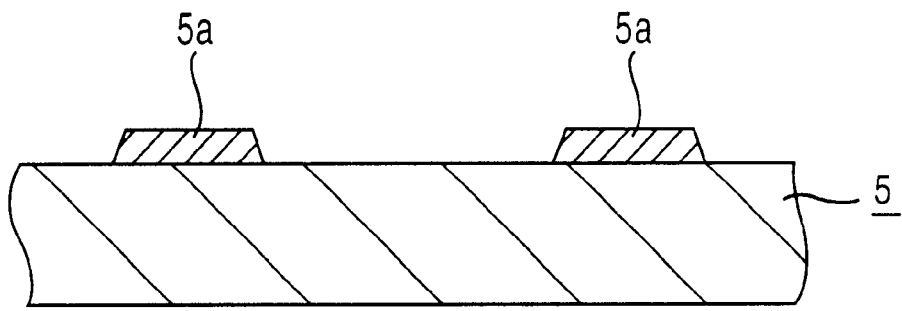

Thereafter, the photoresist 15 used as the plating mask is removed by use of a remover to obtain the reflector 5 with the protrusions 5a formed thereon as shown in FIG. 4C.

Figure 5:
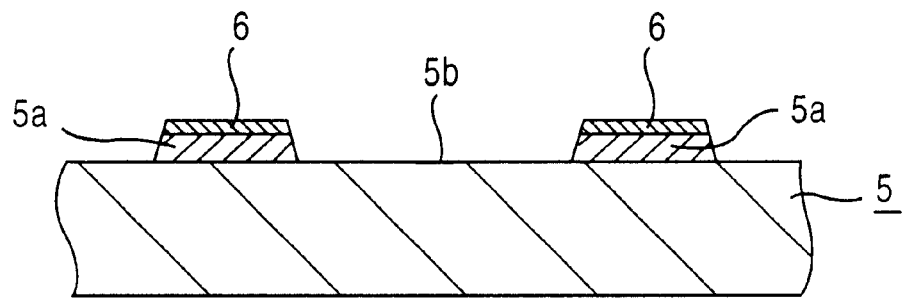
FIG. 5 is a sectional view showing another example of the protrusions of the reflector.

As a constituent material of the protrusions 5a by use of the electroplating method, gold (Au), silver (Ag), nickel (Ni), and so forth are also preferably used, however, as shown in FIG. 5, a thin gold film 6 may be formed on the surface of the protrusions 5a by sputtering, and so forth after the protrusions 5a are formed of copper (Cu).

In this way, an amount of expensive gold (Au) consumed can be reduced, and it becomes possible to form the protrusions having a high reflectance and immune to degradation over time at a relatively low cost.

Next, a method of forming the protrusions on the reflector by the lift-off method is described with reference to FIGS. 6A and 6B.

Figure 6A:
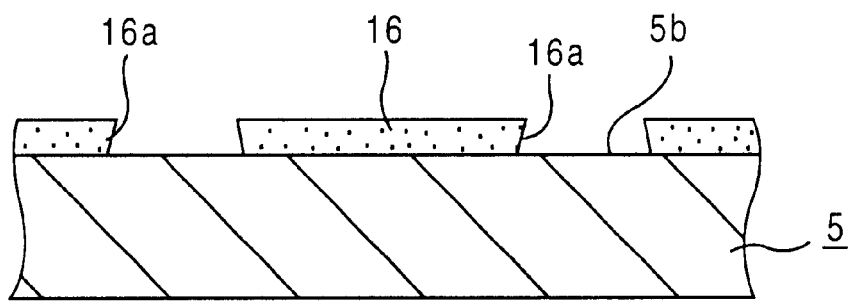
FIGS. 6A and 6B are sectional views of the reflector, and so forth, for illustrating a method of forming the protrusions on the reflector by the lift-off method.

As shown in FIG. 6A, similarly to the case of the electroplating method described above, a photoresist 16 is first formed on the entire surface of a reflection face 5b of a reflector 5 made of aluminum to a thickness equivalent to the thickness of the protrusions.

Subsequently, the photoresist 16 is patterned by the photolithographic method such that openings 16a are formed in regions where respective protrusions are to be formed.

In this case, the photoresist 16 is preferably formed so as to have an overhanging shape in section such that the bottom area of the respective openings 16a is larger than the top area thereof, as shown in FIG. 6A. The photoresist 16 in the overhanging shape can be formed by controlling the treatment conditions of the photolithographic method.

Figure 6B:
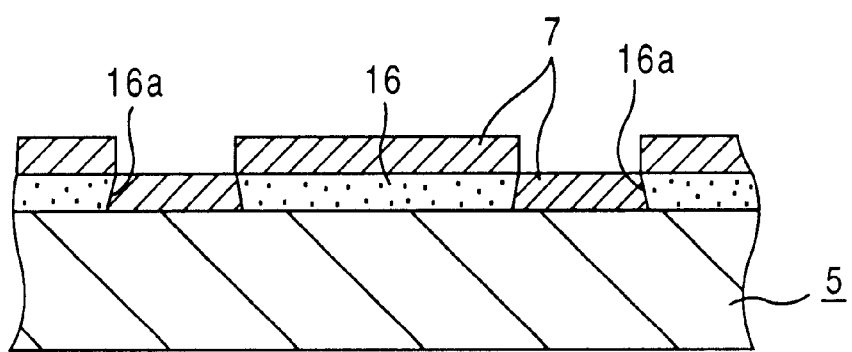

Thereafter, as shown in FIG. 6B, a coating made of a constituent material of the protrusions is formed by the vacuum deposition method or the sputtering method. As a result, a coating 7 is formed inside the respective openings 16a of the photoresist 16 and on top of the photoresist 16, however, in a boundary region between the upper face of the photoresist 16 and the respective openings 16a, a coating is hardly formed or only a very thin coating is formed.

Subsequently, upon removal of the photoresist 16 using a remover, the coating 7 on top of the photoresist 16 is removed together with the photoresist 16 while the coating 7 inside the respective openings 16a is left intact to turn into the protrusions 5a formed on the reflector 5 in the same way as shown in FIG. 4C. Such a method of patterning a coating is called the lift-off method.

As a constituent material for forming the protrusions 5a by the lift-off method, gold (Au), silver (Ag), nickel (Ni), and so forth are also preferably used, however, as shown in FIG. 5, a thin gold film 6 may be formed on the surface of the protrusions 5a by the sputtering method, and so forth after the protrusions 5a are formed of copper (Cu).

Next, a method of forming the protrusions in a shape different from that of the previously described embodiment thereof on the reflector by the electroplating method is described with reference to FIGS. 7A to 7C.

Figure 7A:
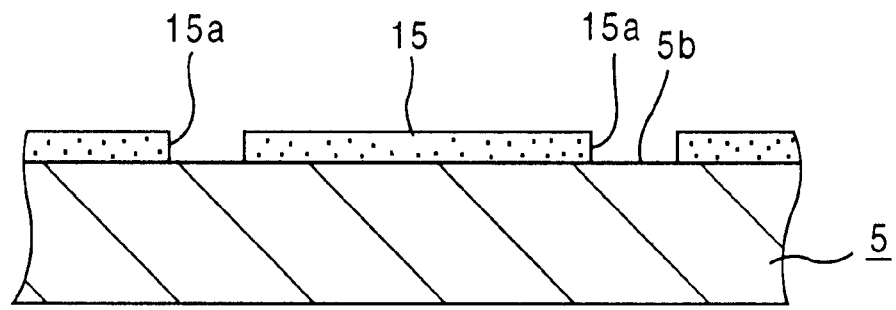
FIGS. 7A to 7C are sectional views of the reflector, and so forth, for illustrating another method of forming the protrusions on the reflector by the electroplating method.
Figure 7B:
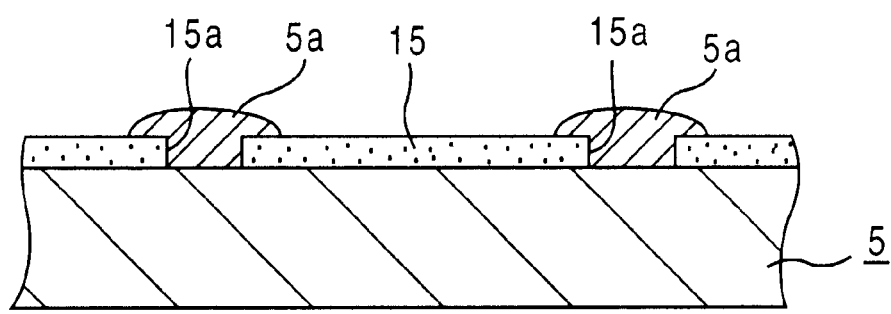
Figure 7C:
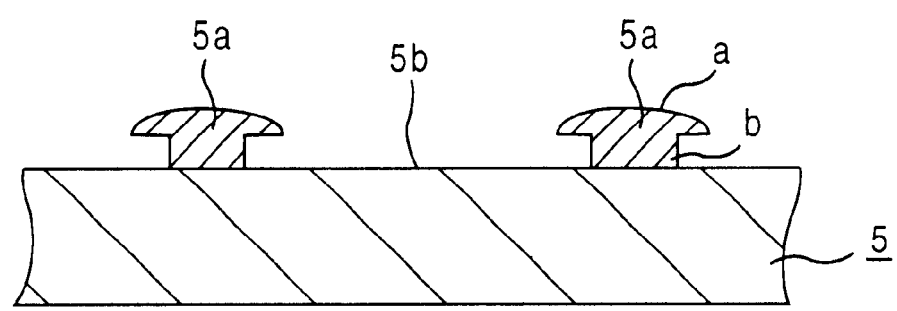

With this embodiment, protrusions 5a, mushroom-like shaped with the uppermost face "a", having a curved convex surface and extending sideways from a base "b" thereof, are formed on a reflection face 5b of a reflector 5 as shown in FIG. 7C.

In this case as well, similarly to the case of the method of forming the protrusions by the electroplating method as described with reference to FIGS. 4A to 4C, a photoresist 15 is formed on the entire surface of a reflection face 5b of a reflector 5 made of aluminum, as shown in FIG. 7A. In this case, however, the photoresist 15 is formed to a thickness thinner than the thickness of protrusions 5a.

Thereafter, the photoresist 15 is patterned such that openings 15a are formed in regions where respective protrusions are to be formed as shown in FIG. 7A, by the photolithography method where in an exposure treatment is applied thereto by use of a predetermined photomask and a development treatment is further applied thereto.

Subsequently, as shown in FIG. 7B, the respective protrusions 5a made up of a plating film are formed within the openings 15a of the photoresist 15 by the electroplating method. In this case, electroplating is controlled such that the plating film is caused to build up so as to have a thickness thicker than that of the photoresist 15.

If plating is carried out such that the thickness of the plating film exceeds that of the photoresist 15, isotropic growth of the plating film occurs during formation of a coating by the electroplating method, and as shown in the figure, the protrusions 5a come to take a mushroom-like shape in section with the uppermost face "a" thereof, having a curved convex surface and extending sideways from the base "b".

In this electroplating as well, the reflector 5 serves as a plating electrode while the photoresist 15 serves as a plating mask.

Thereafter, the photoresist 15 used as the plating mask is removed by use of a remover, thereby obtaining the reflector 5 with the protrusions 5a in a mushroom-like shape in section formed thereon as shown in FIG. 7C.

Thus, by forming the protrusions 5a of the reflector 5 in a shape having a curved convex surface having no ridgeline, a natural three-dimensional effect can be created, and furthermore, by forming the same in the mushroom-like shape in section, the three-dimensional effect can be increased because differences in height thereof with the reflection face 5b becomes more pronounced.

Figure 8:
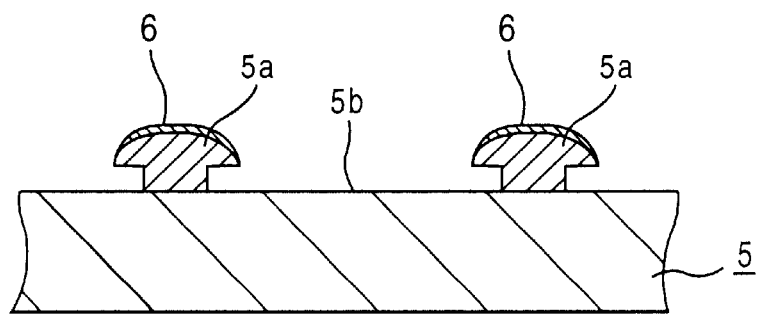
FIG. 8 is a sectional view showing still another example of the protrusions of the reflector.

As in previous cases, gold (Au), silver (Ag), nickel (Ni), and so forth are preferably used as a constituent material for forming the protrusions 5a, however, as shown in FIG. 8, a thin gold film 6 may be formed on the surface of the protrusions 5a by the sputtering method, and so forth after the protrusions 5a are formed of copper (Cu).

Figure 9:
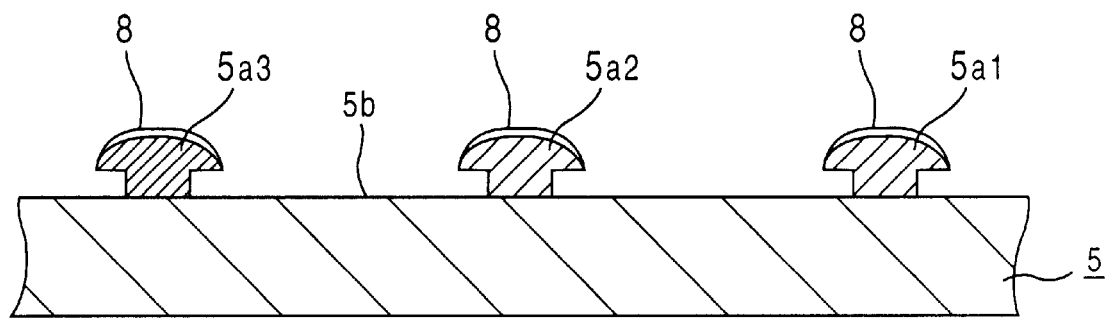
FIG. 9 is a sectional view showing a further example of the protrusions of the reflector.

Further, as shown in FIG. 9, a plurality of protrusions $5a_1$, $5a_2$, and $5a_3$, mushroom-like shape in section, respectively, may be formed of material of various reflection colors that differ depending on spots of formation thereof on the reflection face 5b of the reflector 5.

In this case, by repeating a plurality of times a process of patterning the photoresist 15 and electroplating, as described above, for example, a first protrusion $5a_1$ may be formed of copper, a second protrusion $5a_2$ of silver or nickel, and a third protrusion $5a_3$ of gold, respectively. As a result, the first protrusion $5a_1$ can give out a reddish reflection color, the second protrusion $5a_2$ a nearly white reflection color, and the third protrusion $5a_3$ a yellowish reflection color.

Accordingly, in the case where the liquid crystal display panel 3 shown in FIG. 1 is provided with a plurality of display electrodes 3c, 3d for displaying different pieces of information, disposed at different positions, it is possible to display the respective pieces of information in different color tones by disposing the respective protrusions $5a_1$, $5a_2$, and $5a_3$ of the reflector 5 in correspondence with the plurality of the display electrodes 3c, 3d for displaying the different pieces of information, respectively.

In order to prevent the respective protrusions $5a_1$, $5a_2$, and $5a_3$ of the reflector 5 respectively formed of different metals from undergoing discoloring, a protective film 8 is preferably formed at least on top thereof by clear painting.

For a clear color paint, use may be made of, for example, "Origin Plate" (trade name) composed of a two-fluid urethane resin manufactured by Origin Electric Co., Ltd.

Further, by forming the respective protrusions $5a_1$, $5a_2$, and $5a_3$ of the same metal (for example, copper), and forming a coating of a color paint at least on top thereof as a protective film 8, it is possible to freely change reflection colors of the respective protrusions.

Figure 10:
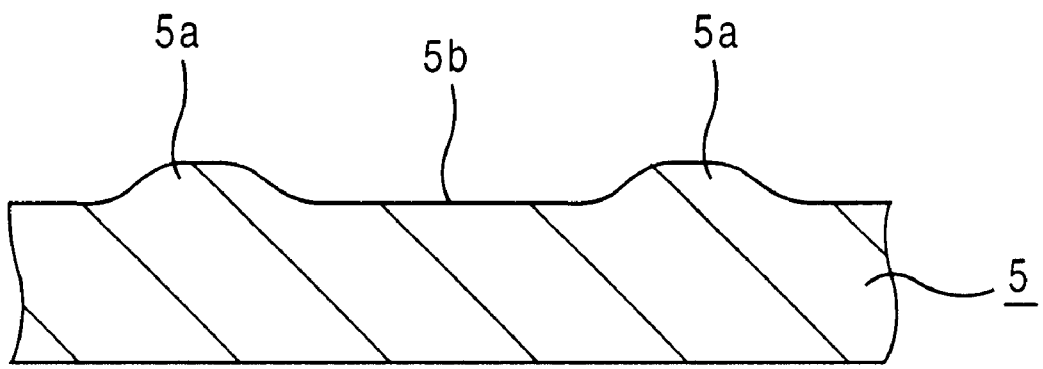
FIG. 10 is a sectional view of the reflector, for illustrating a method of forming the protrusions on the reflector by the coining method.

Now, a method of forming the protrusions on the reflector by the coining method is described with reference to FIG. 10.

The coining method is a method in which the protrusions are formed by press working with the use of molds.

More specifically, depressions corresponding to protrusions 5a to be formed on top of a reflector 5 are formed in a lower mold, and the lower mold and an upper mold are set in a die set. The depression of the lower mold are sized to have a depth substantially equivalent to the height of the protrusions 5a to be formed.

Thereafter, an aluminum film for making up the reflector 5 is placed between the lower mold and the upper mold, and then, pressure is applied to the upper mold.

Thereupon, the aluminum film undergoes plastic deformation, so that the protrusions 5a corresponding to the depressions formed in the lower mold can be formed on the reflector 5. FIG. 10 shows an example of the reflector 5 with the protrusions 5a thus formed on a reflection face 5b.

Thus, by forming the protrusions 5a of the reflector 5 in a shape having a smooth curved convex surface without ridgelines, it is possible to display information mellowly and three-dimensionally.

Figure 11:
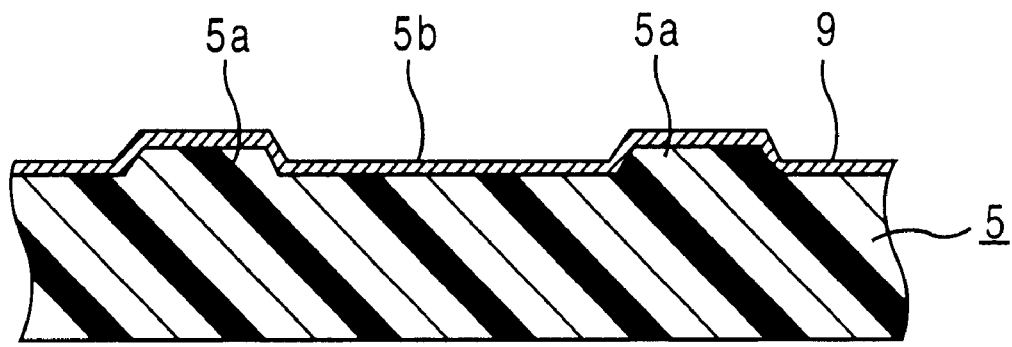
FIG. 11 is a sectional view of the reflector, for illustrating another method of forming the protrusions on the reflector.

FIG. 11 is a view showing another embodiment of the reflector, and in the figure, a reflector 5 including protrusions 5a is formed of a non-metallic material such as resin, and so forth. A thin film 9 made of a metallic material is formed on a reflection face 5b including the surfaces of the protrusions 5a. For the metallic material forming the thin film 9, a metal having a high surface reflectance such as aluminum, gold, silver, nickel, and so forth is used. A method of forming the thin film 9 is by the vacuum deposition method, the sputtering method, and so forth.

Next, a method of forming the protrusions on the reflector by use of the photolithography method and the etching method is described with reference to FIGS. 12A to 12C.

Figure 12A:
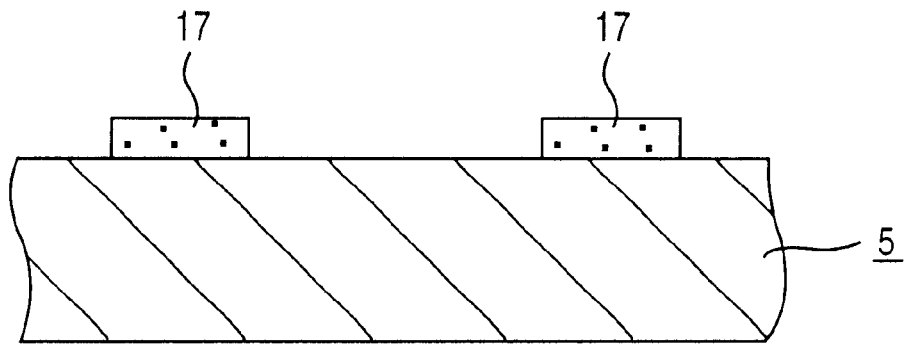
FIGS. 12A to 12C are sectional views of the reflector, and so forth, for illustrating a method of forming the protrusions on the reflector by use of the photolithography method and the etching method.

First, a photoresist 17 made of a photosensitive material is formed on the entire surface of a reflector 5 made of aluminum shown in FIG. 12A. The photoresist 17 may be formed to a thickness which will remain intact after an etching treatment is applied.

There are available various methods of forming the photoresist 17 such as the spin coating method, the dipping method wherein the reflector 5 is immersed in a photoresist liquid and then pulled up, the method of laminating a dry film resist to the reflector 5, and so forth.

Thereafter, as shown in FIG. 12A, the photoresist 17 is patterned in such a way as to be left intact in regions where respective protrusions are to be formed, by the photolithographic method wherein an exposure treatment is applied thereto by use of a predetermined photomask and a development treatment is further applied thereto.

Figure 12B:
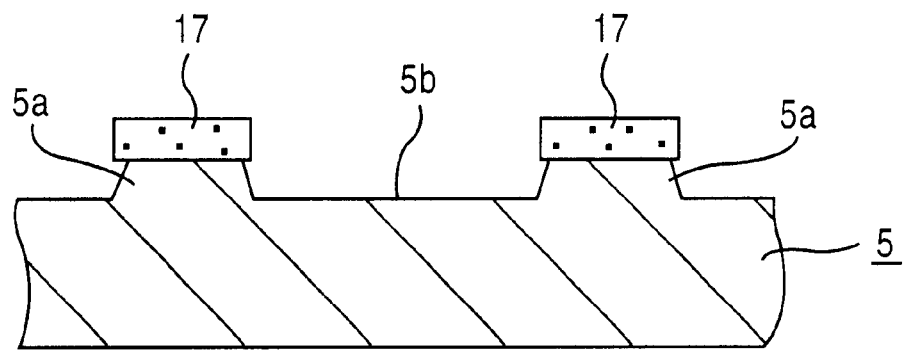

Subsequently, as shown in FIG. 12B, by the wet-etching method using the patterned photoresist 17 as an etching mask, the reflector 5 is etched to form a reflection face 5b, leaving the protrusions 5a intact.

As an etchant for aluminum, a mixed solution consisting of phosphoric acid and acetic acid is used, and by regulating an etching time length, an etching depth can be controlled, thereby the protrusions 5a having a desired thickness are obtained.

Figure 12C:
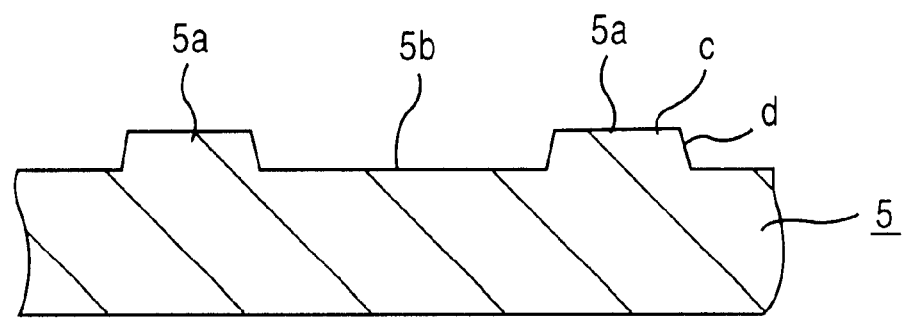

Thereafter, as shown in FIG. 12C, the photoresist 17 used as the etching mask is removed by use of a remover. As a result, the protrusions 5a can be formed on the reflection face 5b of the reflector 5.

By forming the protrusions 5a on the reflector 5 in this way, it becomes possible to differentiate a surface reflectance of the uppermost face "c" of the respective protrusions 5a from that of the side faces "d" thereof. In this case, the uppermost face "c" of the respective protrusions 5a becomes a mirror-finished surface while the side faces "d" thereof becomes light scattering surfaces (rough surfaces).

Thus, by differentiating the surface reflectance of the uppermost face "c" of the respective protrusions 5a from that of the side faces "d" thereof, light falling on the protrusions 5a is caused to reach the eyes of a viewer with clear differences in arrival time between light component reflected by the uppermost face "c" and light components reflected by the side faces "d", enabling display to have a greater three-dimensional effect.

Next, another embodiment of a method of forming the protrusions on the reflector by use of the photolithography method and the etching method is described with reference to FIGS. 13A and 13B.

Figure 13A:
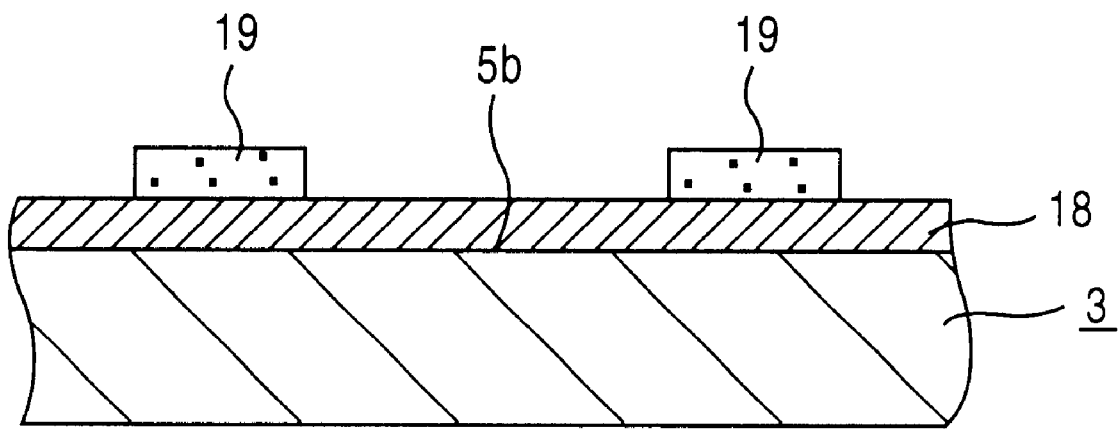
FIGS. 13A and 13B are sectional views of the reflector, and so forth, for illustrating another method of forming the protrusions on the reflector by use of the photolithography method and the etching method.

First, as shown in FIG. 13A, a coating 18 made of a constituent material of the protrusions is formed on the entire surface of a reflection face 5b of a reflector 5 made of aluminum.

As a method of forming the coating 18, the vacuum deposition method, the sputtering method, a method of laminating a foil material to the reflector 5, and so forth may be adopted.

Thereafter, a photoresist 19 is formed on the entire surface of the coating 18. The photoresist 19 is preferably formed to a thickness which will remain intact after an etching treatment is applied. A method of forming the photoresist 19 is the same as that described in the preceding embodiment.

Thereafter, as shown in FIG. 13A, the photoresist 19 is patterned in such a way as to be left intact in regions where respective protrusions are to be formed, by the photolithography method wherein an exposure treatment is applied thereto by use of a predetermined photomask and a development treatment is further applied thereto.

Figure 13B:
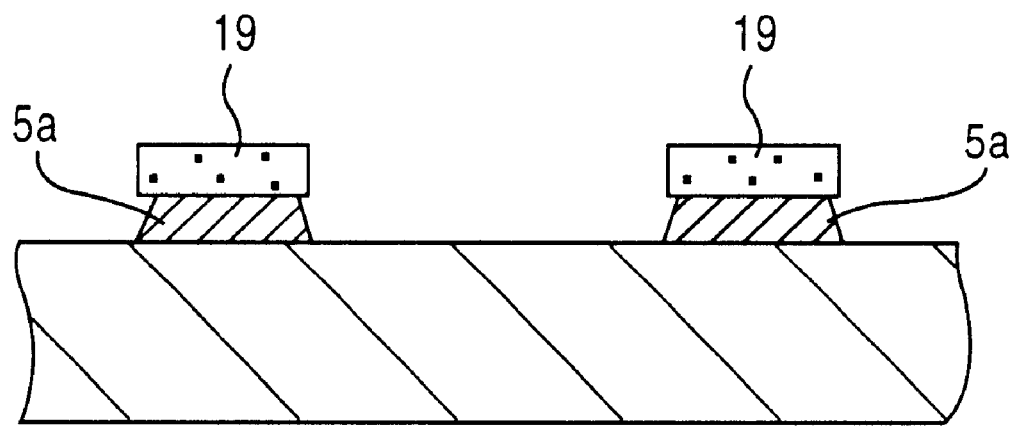

Subsequently, as shown in FIG. 13B, by the wet-etching method using the patterned photoresist 19 as an etching mask, the reflector 5 is etched to form the protrusions 5a.

An etchant used in this case is one having an etch rate against the coating 18 greater than an etch rate against the constituent material of the reflector 5. As a result, it is possible to selectively etch only the coating 18 which is the constituent material of the protrusions 5a, thus hardly etching the constituent material of the reflector 5.

Thereafter, the photoresist 19 used as the etching mask is removed by use of a remover. As a result, the protrusions 5a can be formed on the reflector 5.

Even when the protrusions 5a are formed on the reflector 5 in this way, it becomes possible to differentiate a surface reflectance of the uppermost face of the respective protrusions 5a from that of the side faces thereof. In this case as well, the uppermost face of the respective protrusions 5a becomes a mirror-finished surface while the side faces thereof become light scattering surfaces (rough surfaces). Resultant effects are the same as those in the previously described case.

Now, a method of forming the protrusions on the reflector by use of the honing method is described hereinafter.

In working by the honing method, a workpiece is worked on by shaving off portions of the constituent material of the workpiece from the surface thereof by the agency of energy carried by granular abrasives or a fluid when the granular abrasives or the fluid, especially water, are jetted onto the workpiece at a high velocity.

Accordingly, a hard film or an elastic film is formed so as to correspond to regions where protrusions 5a of a reflector 5 are to be formed. The hard film or a coating having elasticity serves as a mask for the working by the honing method. The reflector 5 with the hard film or the elastic film formed thereon is worked on by applying the honing method thereto to form the protrusions 5a.

Thereafter, by removing the hard film or the elastic film used as the mask, the reflector 5 having the protrusions 5a is obtained.

In this case as well, it is possible to differentiate a surface reflectance of the uppermost face of the respective protrusions 5a from that of the side faces thereof.

There is available still another method of forming the protrusions 5a on the reflector 5, wherein the protrusions 5a can be formed at required spots on top of a planar reflection face of the reflector 5 by use of a coating only formed of a clear paint or a color paint.

Figure 14:
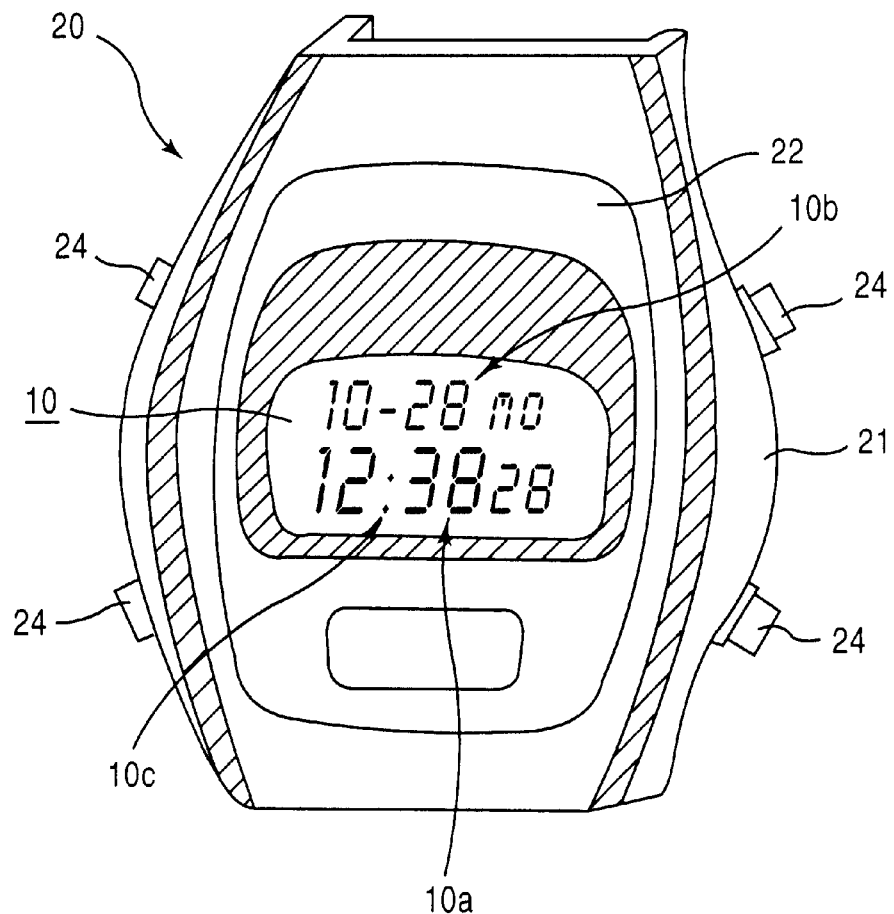
FIG. 14 is a perspective view of an embodiment of an electronic timepiece according to the invention, showing the external view thereof.
Figure 15:
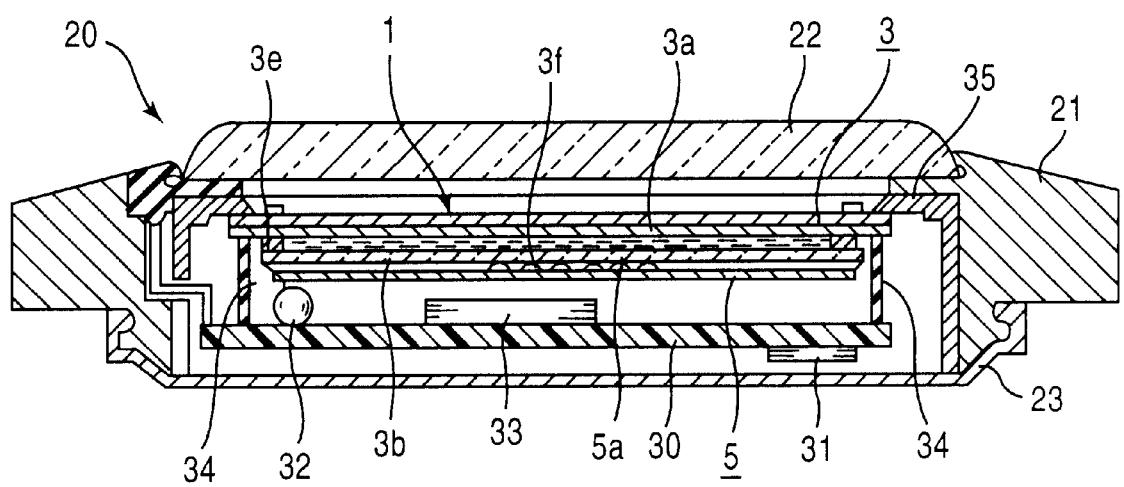
FIG. 15 is a sectional view of the electronic timepiece shown in FIG. 14, showing the internal construction thereof.

Embodiment of Electronic Timepiece: FIGS. 14 and 15

Now, an embodiment of an electronic timepiece according to the invention incorporating the liquid crystal display device of the invention as described in the foregoing will be described with reference to FIGS. 14 and 15.

FIG. 14 is a perspective view of the electronic timepiece, showing the external view thereof, and FIG. 15 is a sectional view of the electronic timepiece, showing the internal construction thereof.

This electronic timepiece is a digital display type electronic wrist watch, and a case 20 thereof comprises a glass 22 and a case back 23 integrally joined with a case body 21 made of metal. The glass 22 is made of a transparent material such as sapphire glass, tempered glass, or a resin material, and is bonded with the front face of the case body 21 or fitted therein using packing. The case back 23 is integrally joined with the back face of the case body 21 by screwing therein or fitted therein with packing interjacent therebetween.

Thus, the case 20 has an airtight inner structure so as not to allow ingress of dust and moisture.

As shown in FIG. 15, the liquid crystal display device 1 comprising the liquid crystal display panel 3 and the reflector 5 is disposed inside the case 20, on the glass 22 side thereof, and the liquid crystal display panel 3 constitutes a display portion 10 shown in FIG. 14. The liquid crystal display panel 3 is provided with a dial cover 35 at the periphery thereof.

The display portion 10 comprises a time display section 10a for displaying the hour, minute and second, a calendar display section 10b for displaying the month, day and days of the week, and a colon mark display section 10c that blinks every second.

The display electrodes (not shown herein) opposite to each other are respectively formed respectively on the side of the respective substrates 3a, and 3b of the liquid crystal display panel 3 constituting the display portion 10, in contact with the liquid crystal 3f, as described with reference to FIG. 1, and regions for displaying numerals are patterned such that one character is displayed by seven-segment electrodes 13 disposed in the form of a number "8" as shown in FIG. 2. In other display sections as well, the respective display electrodes are patterned in segments to correspond to the content of display.

By selectively applying a voltage between the respective display electrodes of the liquid crystal display panel 3, time display, calendar display, and mark display are indicated as predetermined.

Further, the electronic timepiece is capable of displaying functions including time display for 12 consecutive hours or 24 consecutive hours as usual, an alarm function, a stopwatch function, a timer function, and so forth.

Changeover among such various display functions and correction of time are executed by manipulating a plurality of manipulation switches 24 installed in the case body 21 of the case 20.

Packing (not shown) is provided between the respective manipulation switches 24 and the case body 21 to form the airtight inner structure, preventing dust and moisture from making ingress into the case 20.

As shown in FIG. 15, the electronic timepiece has an inner construction such that the liquid crystal display panel 3 and a printed circuit board 30 are disposed substantially parallel with each other inside the case 20, and a battery 31 serving as a driving power source for the printed circuit board 30 is installed on the case back 23 side of the printed circuit board 30.

A semiconductor integrated circuit 33 comprising a crystal oscillator 32 having an oscillation frequency of 32,768 Hz, a crystal oscillation circuit for generating a predetermined signal by oscillating the crystal oscillator, a counting-down circuit, a driving circuit for driving the liquid crystal display panel 3, a central processing unit (CPU) for overall control of the electronic timepiece, and so forth, is mounted on the printed circuit board 30.

The liquid crystal display panel 3 is electrically connected with the printed circuit board 30 via a zebra-rubber 34 disposed therebetween. The zebra-rubber 34 is made to be compressed thicknesswise in order to ensure electrical connection between the liquid crystal display panel 3 and the printed circuit board 30. The zebra-rubber 34 is made up so that electrically conductive layers with carbon or metal particles contained therein are formed at a predetermined pitch in insulating silicone rubber, so as to be electrically conductive in the direction of thickness thereof via the respective electrically conductive layers, but in an insulated condition between transversely adjacent electrically conductive layers.

Connection terminals are formed on the opposite faces of the liquid crystal display panel 3 and the printed circuit board 30, respectively, in a pattern sized at the same pitch as to correspond to vertically conductive parts of the zebra-rubber 34 composed of the electrically conductive layers and insulating parts of the zebra-rubber 34, that are alternately disposed.

Further, as shown in FIG. 15, with the electronic timepiece, the reflector 5 provided with the protrusions 5a formed at positions corresponding to the display electrodes of the liquid crystal display panel 3 is disposed on the side of the liquid crystal display panel 3, opposite from the visible side thereof.

The liquid crystal display device described in the foregoing comprises the liquid crystal display panel 3 and the reflector 5, and the display portion 10 of the liquid crystal display device is capable of indicating three-dimensional display as described hereinbefore. That is, the time display section 10a, the calendar display section 10b and the mark display section 10c are able to display time information and calendar information three-dimensionally. As described previously, it is also possible to display time information and calendar information in color tones different from each other by differentiating the reflection color of the respective protrusions 5a of the reflector 5 by the display section.

Furthermore, by forming the reflection face of the respective protrusions 5a of the reflector 5 with a curved convex surface, or by differentiating the surface reflectance of the uppermost face of the respective protrusions 5a from that of the side faces thereof, it is possible to indicate mellow three-dimensional display, or to provide display with a greater three-dimensional effect.

Any of the variations of the embodiment of the reflector 5 of the liquid crystal display device as described in the foregoing can be adopted in this electronic timepiece, and may be selected as appropriate, depending on application, and so forth.

INDUSTRIAL APPLICABILITY

As described hereinbefore, with the liquid crystal display device according to the invention, the protrusions are formed on the reflector disposed on the side of the liquid crystal display panel, opposite from the visible side thereof, and light passing through the liquid crystal display panel is reflected at the surfaces of the protrusions, and light components reflected therefrom reach the eyes of a viewer with differences in arrival time due to the surface condition of the protrusions, so that necessary information in the form of characters and so forth is perceived three-dimensionally by the viewer.

Further, it is possible to provide display with variations by changing the shape, constitution, surface condition, and so forth of the reflector, so that mellow images can be displayed, or color tones can be changed by the display section of the liquid crystal display panel.

Since there is no need of depositing a plurality of liquid crystal display panels on one after another, the liquid crystal display device according to the invention has a thickness equivalent to that of a conventional and ordinary liquid crystal display device, and can be applied to various portable small-sized electronic equipment such as an electronic wrist watch, a cellular phone, a desktop electronic calculator, an electronic dictionary, a portable play station, and so forth.

As the electronic timepiece incorporating the liquid crystal display device is small in size, and is capable of displaying time information and calendar information three-dimensionally, its display has good visibility, and a variety in design can be increased.

What is claimed is:

1. A liquid crystal display device comprising:
   a liquid crystal display panel comprising liquid crystal sandwiched between two transparent substrates, and display electrodes made up of a transparent and electrically conductive film formed on the inner face of the respective substrates; and
   a reflector disposed on a side of the liquid crystal display panel opposite from a visible side thereof and provided with protrusions formed in respective areas corresponding to location of the display electrodes on a face thereof opposite to the liquid crystal display panel, no protrusions being provided in other areas not corresponding to the locations of the electrodes, so that a portion of incident light is reflected on a surface of the reflector and a portion of incident light is reflected on a surface of the protrusions.

2. A liquid crystal display device according to claim 1, wherein the liquid crystal is scattering type liquid crystal that undergoes switching back and forth between a light scattering state and a transparent state by voltage applied from the display electrodes.

3. A liquid crystal display device according to claim 2, wherein the scattering type liquid crystal is any one selected from the group consisting of polymer network liquid crystal, polymer dispersion liquid crystal, and dynamic scattering liquid crystal.

4. A liquid crystal display device according to claim 1, wherein the liquid crystal is guest-host liquid crystal provided with a dichroic dye.

5. A liquid crystal display device comprising:
   a liquid crystal display panel comprising liquid crystal sandwiched between two transparent substrates, and display electrodes made up of a transparent and electrically conductive film formed on the inner face of the respective substrates; and
   a reflector disposed on a side of the liquid crystal display panel opposite from a visible side thereof and provided with protrusions formed in respective areas corresponding to locations of the display electrodes on a face thereof opposite to the liquid crystal display panel,
   wherein a plane pattern of the protrusions formed on the reflector is substantially in the form of a figure similar to a figure of a plane pattern of the display electrodes of the liquid crystal display panel.

6. A liquid crystal display device according to claim 5, wherein the protrusions formed on the reflector has a pattern width narrower than that of the display electrodes of the liquid crystal display panel.

7. A liquid crystal display device according to claim 1, wherein the protrusions of the reflector are formed in a shape having a curved convex surface without ridgelines.

8. A liquid crystal display device according to claim 1, wherein the protrusions of the reflector are mushroom-shaped in section, with the uppermost face thereof having a curved convex surface, and extending sideways from the base of the respective protrusions.

9. A liquid crystal display device according to claim 1, wherein the reflector including the protrusions is made of aluminum.

10. A liquid crystal display device according to claim 1, wherein the reflector is made up of an aluminum sheet, and the protrusions are made of a material having a surface reflectance higher than that of aluminum, such as gold, silver, nickel, and so forth.

11. A liquid crystal display device according to claim 1, wherein the reflector is made up of an aluminum sheet, and the protrusions are formed of copper, a thin gold film is formed on the surfaces thereof.

12. A liquid crystal display device according to claim 1, wherein the reflector is formed of a non-metallic material while a thin film made of material having a high surface reflectance is formed on a reflection face of the reflector, including the surfaces of the protrusions.

13. A liquid crystal display device comprising:
   a liquid crystal display panel comprising liquid crystal sandwiched between two transparent substrates, and display electrodes made up of a transparent and electrically conductive film formed on the inner face of the respective substrates; and
   a reflector disposed on a side of the liquid crystal display panel opposite from a visible side thereof and provided with protrusions formed in respective areas corresponding to locations of the display electrodes on a face thereof opposite to the liquid crystal display panel, wherein a surface reflectance of an uppermost face of the respective protrusions of the reflector is differentiated from a surface reflectance of side faces thereof.

14. A liquid crystal display device according to claim 13, wherein the uppermost face of the respective protrusions of the reflector is a mirror-finished surface while the side faces of the respective protrusions are light scattering surfaces.

15. A liquid crystal display device according to claim 1, wherein:

the respective substrates of the liquid crystal display panel are provided with a plurality of display electrodes for displaying different pieces of information;

the reflector is provided with a plurality of protrusions at positions corresponding to the plurality of the display electrodes, respectively, formed on the face thereof opposite to the liquid crystal display panel and;

at least respective reflection faces of the plurality of the protrusions of the reflector are formed of materials in reflection colors differing from each other, depending on spots of formation thereof.

16. A liquid crystal display device according to claim 15, wherein the materials in reflection colors differing from each other are two or more metals among gold, silver or nickel, and copper.

17. A liquid crystal display device according to claim 16, wherein a protective film of clear paint is formed on respective reflection faces of the plurality of the protrusions of the reflector.

18. A liquid crystal display device according to claim 15, wherein the plurality of the protrusions are formed of a coating of paints in different colors depending on spots of formation thereof on a reflection face of the reflector.

19. An electronic timepiece provided with a liquid crystal display device comprising a liquid crystal display panel for displaying at least either of time information and calendar information, and a reflector disposed on the side of the liquid crystal display panel, opposite from the visible side thereof, wherein:

the liquid crystal display panel of the liquid crystal display device comprises liquid crystal sandwiched between two transparent substrates, and display electrodes for displaying at least either of the time information and calendar information made up of a transparent and electrically conductive film formed on the inner face of the respective substrates; and the reflector is provided with protrusions formed in respective areas corresponding to locations of the display electrodes on a face thereof opposite to the liquid crystal display panel, no protrusions being provided in other areas not corresponding to the locations of the electrodes, so that a portion of incident light is reflected on a surface of the reflector and a portion of incident light is reflected on a surface of the protrusions.

20. An electronic timepiece according to claim 19, wherein:

the liquid crystal is scattering type liquid crystal that undergoes switching back and forth between a light scattering state and a transparent state by voltage applied from the display electrodes.

21. An electronic timepiece according to claim 20, wherein:

the scattering type liquid crystal is any one selected from the group consisting of polymer network liquid crystal, polymer dispersion liquid crystal and dynamic scattering liquid crystal.

22. An electronic timepiece according to claim 19, wherein:

the liquid crystal is guest host liquid crystal provided with a dichroic dye.

23. An electronic timepiece provided with a liquid crystal display device comprising a liquid crystal display panel for displaying at least either of time information and calendar information, and a reflector disposed on the side of the liquid crystal display panel, opposite from the visible side thereof, wherein:

the liquid crystal display panel of the liquid crystal display device comprises liquid crystal sandwiched between two transparent substrates, and display electrodes for displaying at least either of the time information and calendar information made up of a transparent and electrically conductive film formed on the inner face of the respective substrates;

the reflector is provided with protrusions formed in respective areas corresponding to locations of the display electrodes on a face thereof opposite to the liquid crystal display panel, and a plane pattern of the protrusions formed on the reflector is substantially in the form of a figure similar to a figure of a plane pattern of the display electrodes of the liquid crystal display panel.

24. An electronic timepiece according to claim 23, wherein:

the protrusions formed on the reflector has a pattern width narrower than that of the display electrodes of the liquid crystal display panel.

25. An electronic timepiece according to claim 19, wherein:

the protrusions of the reflector are formed in a shape having a curved convex surface without ridgelines.

26. An electronic timepiece according to claim 19, wherein:

the protrusions of the reflector are mushroom-liked shape in section, with the uppermost face thereof having a curved convex surface and extending sideways from the base of the respective protrusions.

27. An electronic timepiece according to claim 19, wherein:

the reflector including the protrusions is made of aluminum.

28. An electronic timepiece according to claim 19, wherein:

the reflector is made up of an aluminum sheet, and the protrusions are made of material having a surface reflectance higher than that of aluminum, such as gold, silver, nickel, and so forth.

29. An electronic timepiece according to claim 19, wherein:

the reflector is made up of an aluminum sheet, the protrusions are formed of copper, and a thin gold film is formed on the surfaces thereof.

30. An electronic timepiece according to claim 19, wherein:

the reflector is formed of a non-metallic material while a thin film made of material having a high surface reflectance is formed on a reflection face of the reflector, including the surfaces of the protrusions.

31. An electronic timepiece provided with a liquid crystal display device comprising a liquid crystal display panel for displaying at least either of time information and calendar information, and a reflector disposed on the side of the liquid crystal display panel, opposite from the visible side thereof, wherein:

the liquid crystal display panel of the liquid crystal display device comprises liquid crystal sandwiched between two transparent substrates, and display electrodes for displaying at least either of the time information and calendar information made up of a transparent and electrically conductive film formed on the inner face of the respective substrates;

the reflector is provided with protrusions formed in respective areas corresponding to locations of the display electrodes on a face thereof opposite to the liquid crystal display panel; and a surface reflectance of an uppermost face of the respective protrusions of the reflector is differentiated from a surface reflectance of side faces thereof.

32. An electronic timepiece according to claim 31, wherein:

the uppermost face of the respective protrusions of the reflector is a mirror-finished surface while the side faces of the respective protrusions are light scattering surfaces.

33. An electronic timepiece according to claim 19, wherein:

the respective substrates of the liquid crystal display panel are provided with a plurality of display electrodes for displaying different pieces of information;

the reflector is provided with a plurality of protrusions at positions corresponding to the plurality of the display electrodes, respectively, formed on the face thereof opposite to the liquid crystal display panel;

and at least respective reflection faces of the plurality of the protrusions of the reflector are formed of materials in reflection colors differing from each other, depending on spots of formation thereof.

34. An electronic timepiece according to claim 33, wherein:

the materials in different reflection colors are two or more metals among gold, silver or nickel, and copper.

35. An electronic timepiece according to claim 34, wherein:

a protective film of clear paint is formed on respective reflection faces of the plurality of the protrusions of the reflector.

36. An electronic timepiece according to claim 33, wherein:

the plurality of the protrusions are formed of a coating of paints in different colors depending on spots of formation thereof on a reflection face of the reflector.

37. A liquid crystal display device according to claim 12, wherein the non-metallic material is a resin.

38. A liquid crystal display device according to claim 12, wherein the material having a high surface reflectance is aluminum, gold, silver or nickel.

39. An electronic timepiece according to claim 30, wherein the non-metallic material is a resin.

40. An electronic timepiece according to claim 30, wherein the material having a high surface reflectance is aluminum, gold, silver or nickel.

* * * * *